United States Patent
Utsuno et al.

(10) Patent No.: US 7,145,784 B2
(45) Date of Patent: Dec. 5, 2006

(54) DC POWER SOURCE APPARATUS

(75) Inventors: Mizuki Utsuno, Niiza (JP); Yoshikazu Takahashi, Niiza (JP); Hiroyuki Chikashige, Niiza (JP); Hiromi Koiwai, Kawagoe (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 11/208,069

(22) Filed: Aug. 19, 2005

(65) Prior Publication Data
US 2006/0044844 A1 Mar. 2, 2006

(30) Foreign Application Priority Data
Aug. 30, 2004 (JP) ............................ P2004-249949

(51) Int. Cl.
H02M 3/335 (2006.01)
H01F 5/00 (2006.01)
(52) U.S. Cl. .................... 363/16; 363/21.01; 363/39; 336/200
(58) Field of Classification Search .................. 363/16, 363/21.01, 39, 40; 323/247, 250, 251; 336/170, 336/222, 223, 232, 200
See application file for complete search history.

(56) References Cited
U.S. PATENT DOCUMENTS
6,222,742 B1 * 4/2001 Schlecht ...................... 363/16
6,980,074 B1 * 12/2005 Jitaru .......................... 336/200

FOREIGN PATENT DOCUMENTS
JP 09-17657 1/1997

* cited by examiner

Primary Examiner—Jessica Han
(74) Attorney, Agent, or Firm—Brenda O. Holmes; Kilpatrick Stockton LLP (57) ABSTRACT

A DC power source apparatus has a DC power source for supplying a DC voltage, a transformer, and a switching element connected to a primary winding of the transformer. The switching element carries out ON/OFF operations to convert the DC voltage from the DC power source into high-frequency power, which is transferred to a secondary winding of the transformer and is converted into a DC output voltage. The primary winding of the transformer consists of a first primary winding made of a plurality of winding layers and a second primary winding made of a plurality of winding layers. The first and second primary windings are connected in parallel. The first primary winding is arranged on an inner side of the secondary winding, and the second primary winding is arranged on an outer side of the secondary winding. A terminal of a winding layer farthest from the secondary winding among the winding layers of each of the first and second primary windings is connected to the switching element.

4 Claims, 9 Drawing Sheets

| P2-2 | (Vp/2 ← 0) | ⊗ |
| P2-1 | (Vp/2 → Vp) | ⊗ |
| S | | ⊗ |
| P1-2 | (Vp/2 ← 0) | ⊗ |
| P1-1 | (Vp/2 → Vp) | ⊗ |

FIG. 13B

| P2-1 | (Vp/2 → Vp) | ○ |
| P2-2 | (Vp/2 ← 0) | ⊙ |
| S | | ⊗ |
| P1-2 | (Vp/2 ← 0) | ⊗ |
| P1-1 | (Vp/2 → Vp) | ⊗ |

DC POWER SOURCE APPARATUS

BACKGROUND OF THE INVENTION

1. Field of the Invention

The present invention relates to a DC power source apparatus, and particularly, to a power converting transformer for a DC power source apparatus.

2. Description of the Related Art

Figure 1:
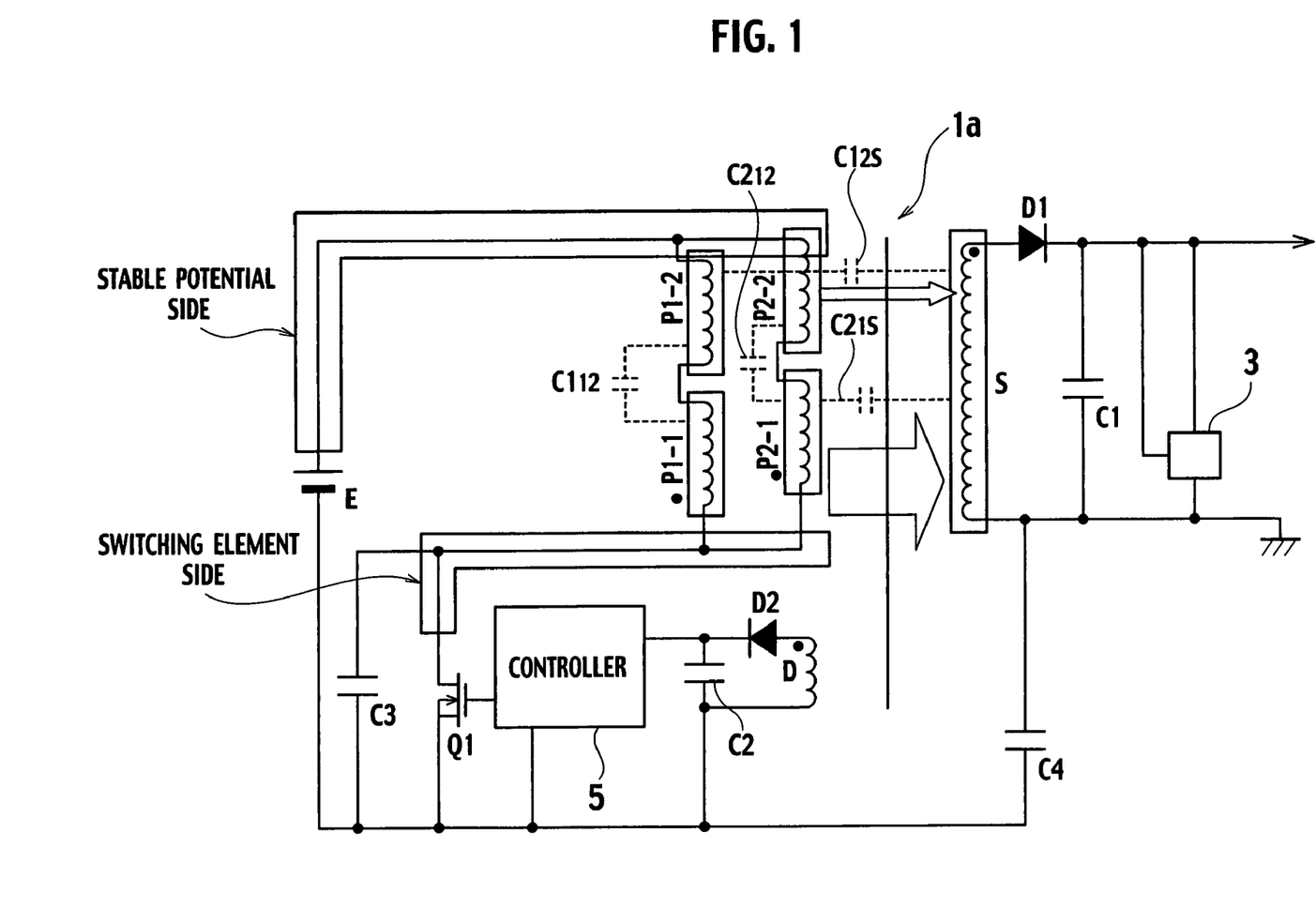
FIG. 1 is a circuit diagram showing a DC power source apparatus having a transformer according to a related art.

FIG. 1 is a circuit diagram showing a DC power source apparatus according to a related art. In the apparatus of FIG. 1, a DC power source E supplies a DC voltage. A switching element Q1 is, for example, a MOSFET and carries out ON/OFF operations to convert the DC voltage from the DC power source E into high-frequency power. A transformer 1a is connected between the switching element Q1 and a positive electrode of the DC power source E, so that the high-frequency power is transmitted from the primary side of the transformer 1a to the secondary side thereof. The high-frequency power on the secondary side of the transformer 1a is converted into a DC output voltage through a rectifying/smoothing circuit consisting of a diode D1 and a smoothing capacitor C1. The DC output voltage is supplied to a load. An output voltage detector 3 detects the DC output voltage, compares the detected voltage with a reference voltage, and provides an error signal representative of the result of the comparison. According to the error signal, a control circuit (controller) 5 controls ON/OFF intervals of the switching element Q1 so that a predetermined output voltage is supplied to the load.

A tertiary winding D of the transformer 1a induces a voltage, which is rectified and smoothed through a diode D2 and a capacitor C2. The rectified and smoothed voltage is supplied as a source voltage to the controller 5.

Figure 2:
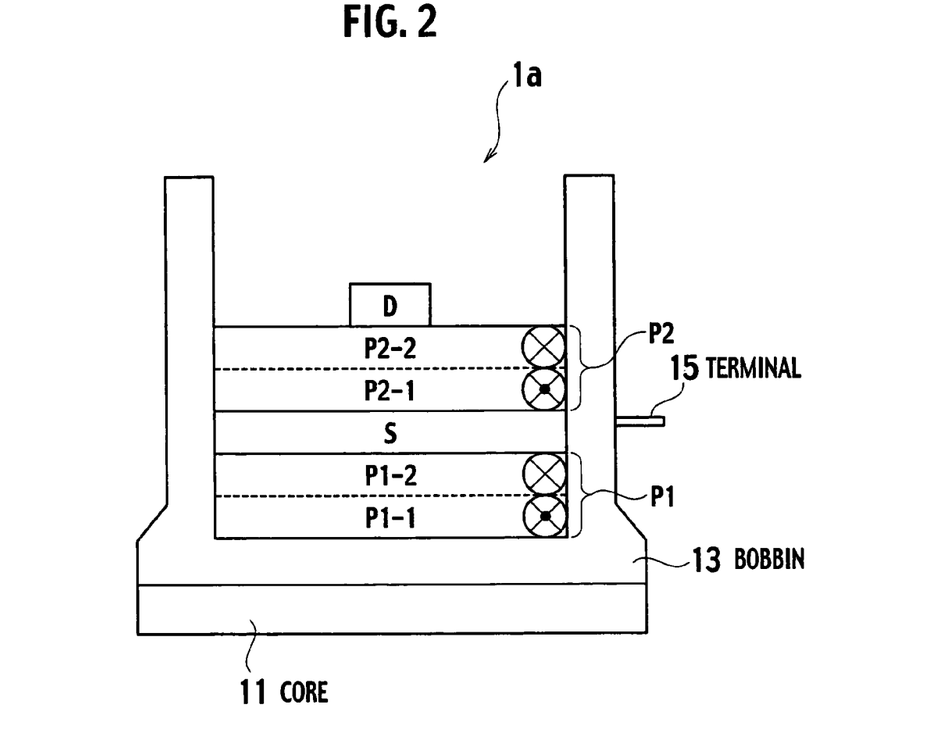
FIG. 2 is a sectional view showing the structure of the transformer of FIG. 1.
Figure 3:
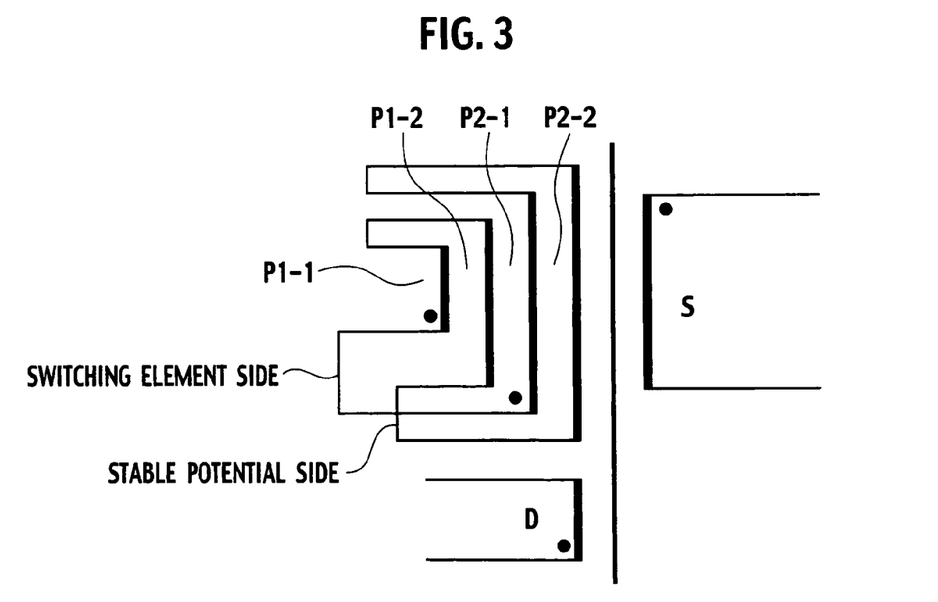
FIG. 3 is a view showing windings of the transformer of FIG. 1.
Figure 4:
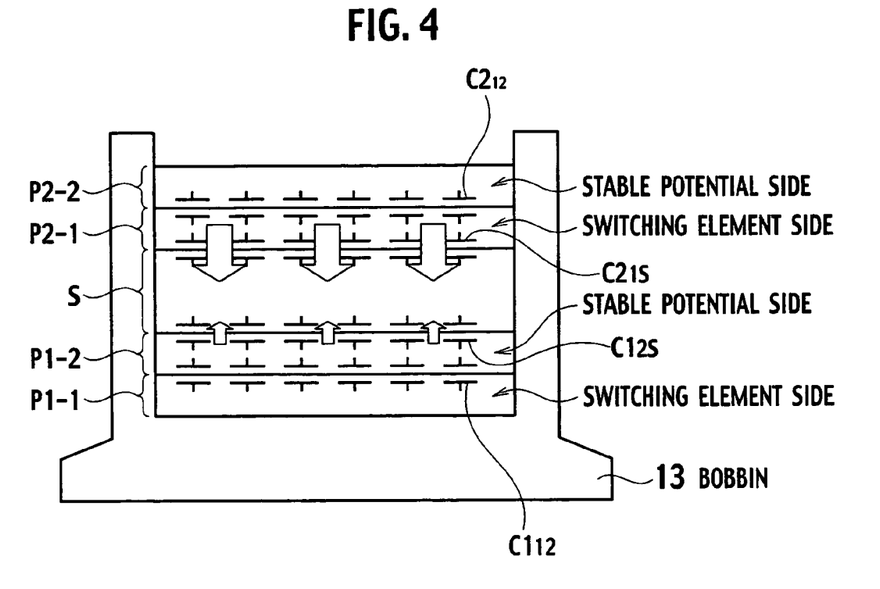
FIG. 4 is a sectional view showing parasitic capacitance among the windings of the transformer of FIG. 1.

FIG. 2 is a sectional view showing the transformer 1a in the DC power source apparatus of FIG. 1, FIG. 3 is a view showing windings of the transformer 1a, and FIG. 4 is a sectional view showing the transformer 1a and parasitic capacitance formed among the windings of the transformer 1a.

In FIG. 2, the transformer 1a has a core 11 made of magnetic material inserted into a bobbin 13. Inside the bobbin 13, first primary winding P1, a secondary winding S, a second primary winding P2, and the tertiary winding D are sequentially are sequentially arranged. The first primary winding P1 consists of two winding layers P1-1 and P1-2. The second primary winding P2 consists of two winding layers P2-1 and P2-2.

Forming of the windings in the bobbin 13 will be explained. A wire is wound from a right end of the bobbin 13 in a vertical downward direction to form the winding layer P1-1. The wire is turned at a left end of the bobbin 13 and is wound to form the winding layer P1-2 on the winding layer P1-1, thereby completing the first primary winding P1. On the winding layer P1-2, the secondary winding S is wound. Thereafter, the winding layers P2-1 and P2-2 are wound in the same direction as the winding layers P1-1 and P1-2.

To improve manufacturability, the windings of the transformer 1a are usually wound in the same direction. In FIG. 1, the first and second primary windings P1 and P2 are connected in parallel. In FIGS. 2 and 4, the secondary winding S is arranged between the first and second primary windings P1 and P2, to increase the degree of coupling of these windings P1, P2, and S. In this case, there is parasitic capacitance C112 between the winding layers P1-1 and P1-2, parasitic capacitance C12S between the winding layer P1-2 and the secondary winding S, parasitic capacitance C21S between the secondary winding S and the winding layer P2-1, and parasitic capacitance C212 between the winding layers P2-1 and P2-2 produced.

In FIGS. 1 and 2, the winding layer P1-1 of the first primary winding P1 and the winding layer P2-1 of the second primary winding P2 adjacent to the secondary winding S are on the switching element Q1 side.

The switching element Q1 is continuously turned on and off therefore, the potential thereof greatly varies for the ON/OFF operations. The potential variations of the switching element Q1 are applied to the first and second primary windings P1 and P2 of the transformer 1a. As a result, high-frequency currents pass through the parasitic capacitance C12S between the winding layer P1-2 of the first primary winding P1 and the secondary winding S and the parasitic capacitance C21S between the winding layer P2-1 of the second primary winding P2 and the secondary winding S to the secondary side of the transformer 1a.

Such high-frequency currents pass through a loop consisting of the first and second primary windings P1 and P2, the secondary winding S, a circuitry on the secondary side, the ground, the parasitic capacitance between the ground and a circuitry on the primary side, the circuitry on the primary side, and the first and second primary windings P1 and P2. Passing to the ground, the high-frequency currents cause common-mode noise. The common-mode noise leaks to the DC power source side and is radiated into space to badly affect other devices.

When the switching element Q1 is turned on, the DC voltage from the DC power source E is applied to a negative side of the first and second primary windings P1 and P2 of the transformer 1a. When the switching element Q1 is turned off, a flyback voltage occurs on a positive side of the first and second primary windings P1 and P2. Namely, first terminals of the first and second primary windings P1 and P2 connected to the switching element Q1 are subjected to large potential variations, and second terminals thereof connected to the DC input voltage that is stable are subjected to no potential variation.

The parasitic capacitance between the first and second primary windings P1 and P2 and the secondary winding S increases as the distance between them shortens. Accordingly, the high-frequency currents passing through the parasitic capacitance between the first and second primary windings P1 and P2 and the secondary winding S will be large if the first terminals of the first and second primary windings P1 and P2 connected to the switching element Q1 are close to the secondary winding S.

In FIG. 4, the start of the first and second primary windings P1 and P2 are connected to the switching element Q1. The winding layer P1-1 that is at the start of the first primary winding P1 is located away from the secondary winding S, and the winding layer P2-1 that is at the start of the second primary winding P2 is located adjacent to the secondary winding S. Accordingly, a large high-frequency current passes the second primary winding P2 through the parasitic capacitance C21S to the secondary winding S. In FIGS. 1 and 4, an arrow represents a high-frequency current with the width of the arrow indicating the magnitude of the current.

Figure 5:
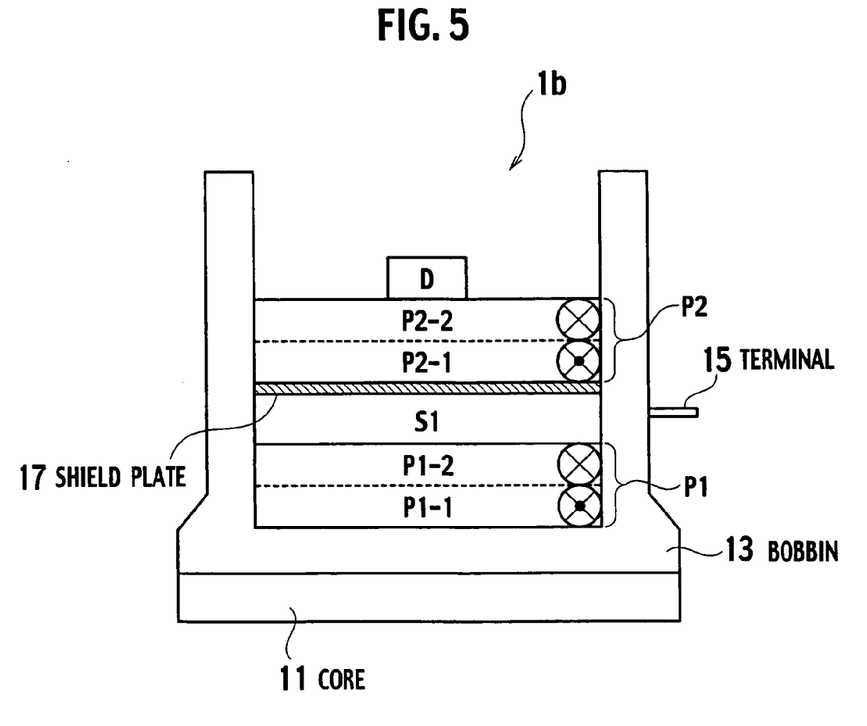
FIG. 5 is a sectional view showing the structure of a transformer according to another related art.
Figure 6:
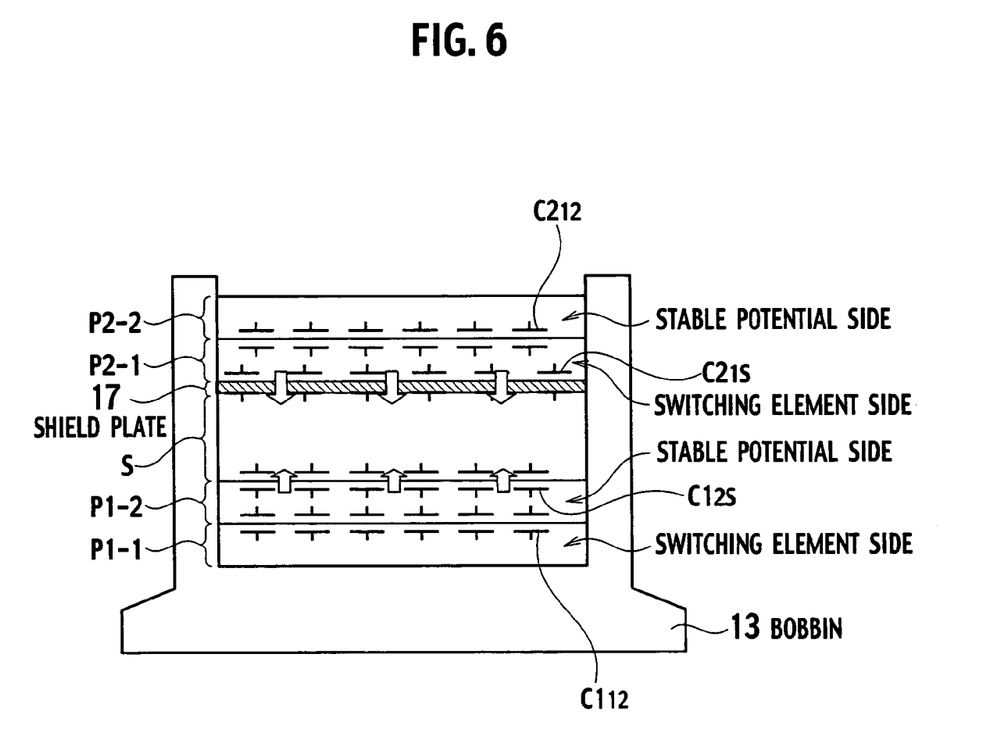
FIG. 6 is a sectional view showing parasitic capacitance among the windings of the transformer of FIG. 5.
Figure 7:
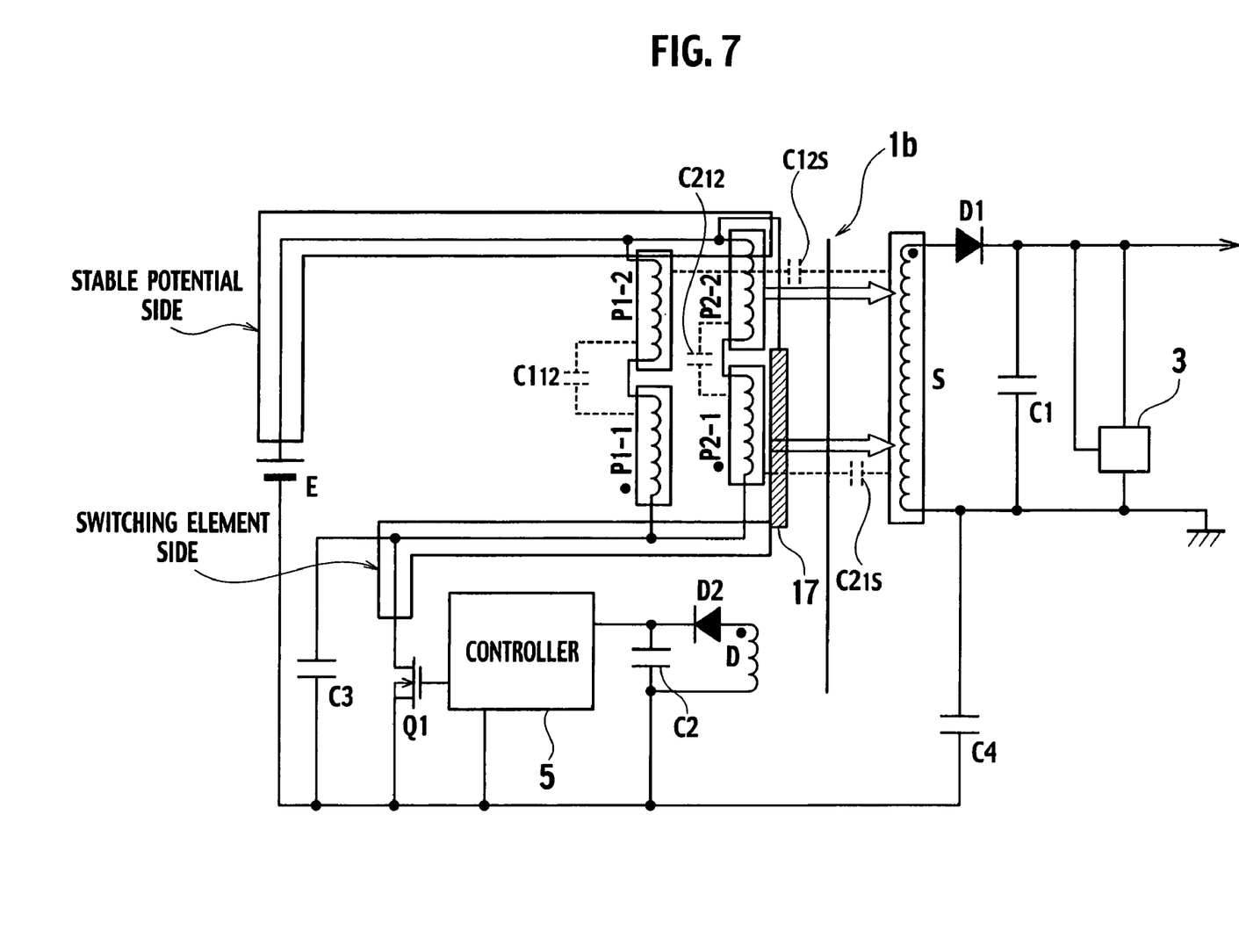
FIG. 7 is a circuit diagram showing a DC power source apparatus employing the transformer of FIG. 5.

To reduce the common-mode noise caused by high-frequency currents, FIGS. 5 to 7 show a transformer 1b according to another related art. FIG. 5 is a sectional view showing the structure of the transformer 1b, FIG. 6 is a sectional view showing parasitic capacitance among windings of the transformer 1*b*, and FIG. 7 is a circuit diagram showing a DC power source apparatus employing the transformer 1*b*.

The transformer 1*b* shown in FIGS. 5 to 7 has a shield plate 17 between a winding layer P2-1 of a second primary winding P2 and a secondary winding S, to reduce parasitic capacitance C21S between the winding layer P2-1 and the secondary winding S. Reducing the parasitic capacitance C21S results in reducing a high-frequency current passing from the primary side of the transformer to the secondary side thereof, thereby decreasing the common-mode noise.

SUMMARY OF THE INVENTION

The shield plate 17 of FIG. 5 used to reduce the parasitic capacitance of the first and second primary windings complicates the structure of the transformer 1*b* and increases the distance between the primary and secondary windings by the thickness of the shield plate 17. This results in increasing leakage inductance between the primary and secondary windings. Accordingly, the related art of FIG. 5 is inappropriate to form a partial voltage resonance converter that uses a flyback voltage produced on a secondary winding to realize a zero-cross switch (zero-voltage switch ZVS).

According to the present invention, a DC power source apparatus having a transformer that is structurally simple and is capable of reducing common-mode noise without increasing leakage inductance can be provided.

In order to accomplish the objective, a first aspect of the present invention provides a DC power source apparatus having a transformer, a switching element connected to a primary winding of the transformer and configured to carry out ON/OFF operations to convert a DC voltage provided by a DC power source into high-frequency power, a rectifying/smoothing circuit configured to convert the high-frequency power transmitted from the primary winding to a secondary winding of the transformer into a DC output voltage, and a controller configured to control ON/OFF intervals of the switching element according to the DC output voltage so that a predetermined output voltage is supplied to a load in which the primary winding of the transformer includes a first primary winding having a plurality of winding layers and a second primary winding having a plurality of winding layers, the first primary winding is arranged on an inner side of the secondary winding, the second primary winding is arranged on an outer side of the secondary winding, and a terminal of a winding layer farthest from the secondary winding among the winding layers of each of the first and second primary windings is connected to the switching element.

According to a second aspect of the present invention, the winding direction of the second primary winding is opposite to the winding direction of the first primary winding.

According to a third aspect of the present invention, a terminal of a winding layer nearest to the secondary winding among the winding layers of each of the first and second primary windings is connected to the DC power source.

DESCRIPTION OF THE PREFERRED EMBODIMENT

A DC power source apparatus according to an embodiment of the present invention will be explained in detail with reference to the accompanying drawings.

Figure 8:
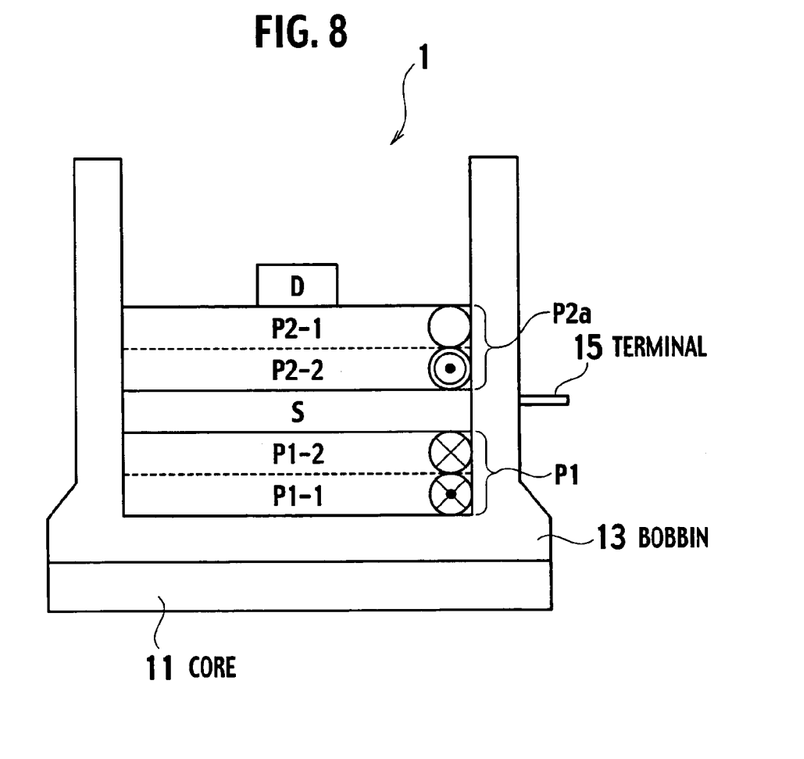
FIG. 8 is a sectional view showing a transformer provided for a DC power source apparatus according to an embodiment of the present invention.
Figure 9:
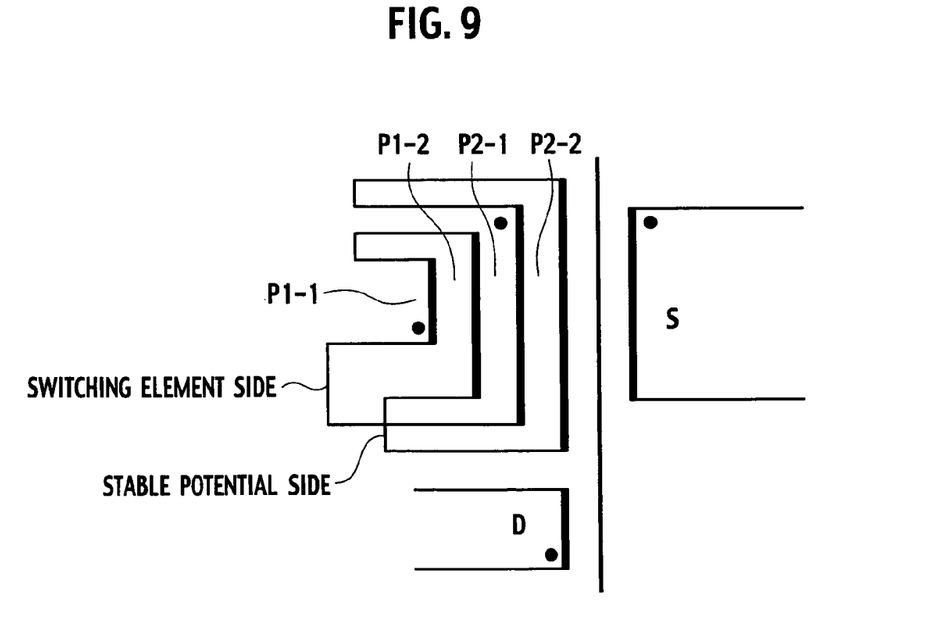
FIG. 9 is a view showing windings of the transformer of FIG. 8.
Figure 10:
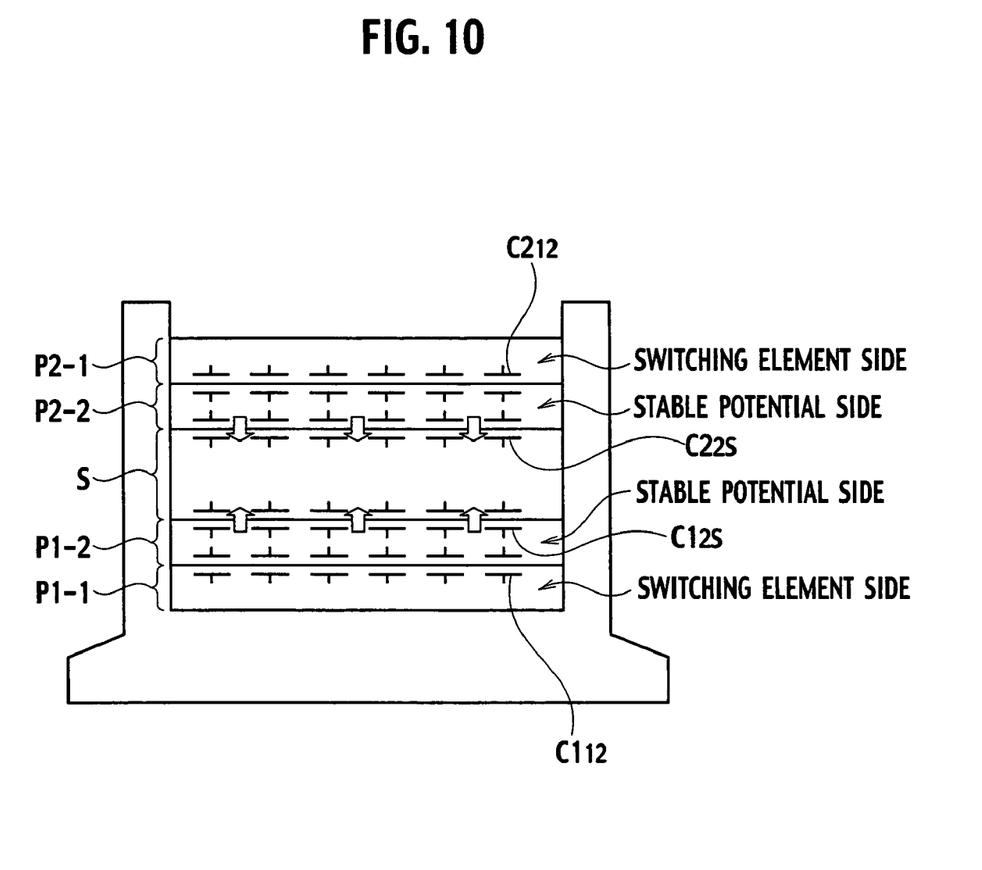
FIG. 10 is a sectional view showing parasitic capacitance existing among the windings of the transformer of FIG. 8.
Figure 11:
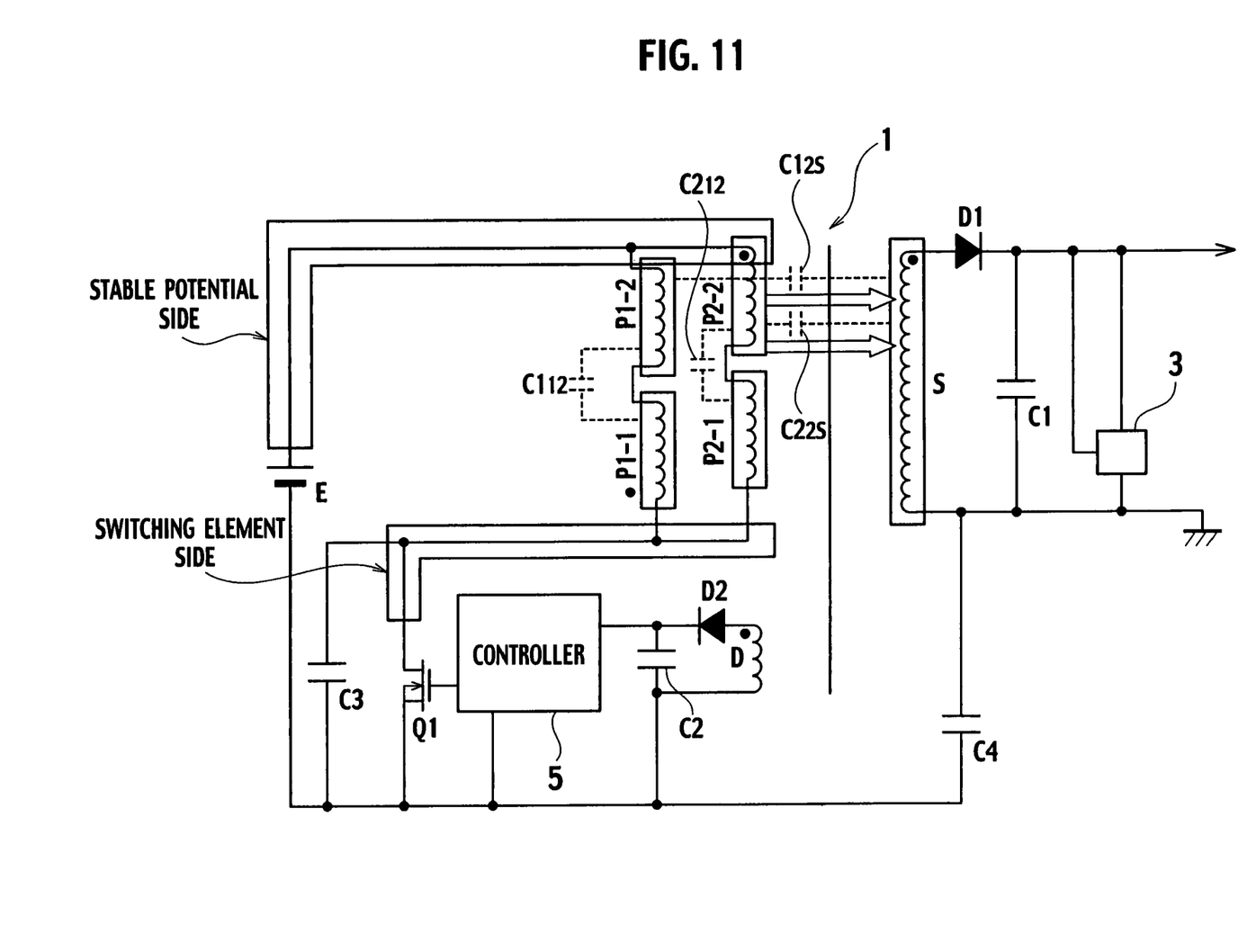
FIG. 11 is a circuit diagram showing a DC power source apparatus employing the transformer of FIG. 8.

FIG. 8 is a sectional view showing a transformer arranged in the DC power source apparatus according to the embodiment. FIG. 9 is a view showing windings of the transformer of FIG. 8. FIG. 10 is a sectional view showing parasitic capacitance among the windings of the transformer of FIG. 8. FIG. 11 is a circuit diagram showing the DC power source apparatus employing the transformer of FIG. 8.

In FIG. 8, the transformer 1 has a core 11 made of magnetic material. The core 11 is inserted into a bobbin 13. Inside the bobbin 13, a first primary winding P1, a secondary winding S, a second primary winding P2*a*, and a tertiary winding D are sequentially arranged. The first primary winding P1 has winding layers P1-1 and P1-2. The second primary winding P2*a* has winding layers P2-2 and P2-1.

Forming of the windings in the bobbin 13 will be explained. A wire is wound from a right end of the bobbin 13 in a vertical downward direction to form the winding layer P1-1. The wire is turned at a left end of the bobbin 13 and is wound to form the winding layer P1-2 on the winding layer P1-1, thereby forming the first primary winding P1. On the winding layer P1-2, the secondary winding S is wound. These processes are the same as those of the related art.

On the secondary winding S, a wire is wound in a vertical upward direction of the bobbin 13 to form the winding layer P2-2. The wire is turned at a left end of the bobbin 13 and is wound to form the winding layer P2-1 on the winding layer P2-2, thereby forming the second primary winding P2*a*.

In FIG. 11, the first primary winding P1 and second primary winding P2*a* are connected in parallel. In FIG. 10, there is parasitic capacitance C112 existing between the winding layer P1-1 and the winding layer P1-2, parasitic capacitance C12S existing between the winding layer P1-2 and the secondary winding S, parasitic capacitance C22S existing between the secondary winding S and the winding layer P2-2, and parasitic capacitance C212 existing between the winding layer P2-1 and the winding layer P2-2.

In FIGS. 10 and 11, the start (depicted with a large black dot) of the winding layer P1-1 and the end of the winding layer P2-1 are connected to a switching element Q1. The end of the winding layer P1-2 and the start (depicted with a large black dot) of the winding layer P2-2 are connected to a stable potential, i.e., a DC input voltage (on the positive electrode side of a DC power source E).

The first primary winding P1 and second primary winding P2a are wound in the counter direction, and therefore, generate magnetic flux of the same phase when a current passes through the windings. Namely, the first and second primary windings P1 and P2a are connected in parallel. According to the embodiment, the start position and winding direction of the second primary winding P2a are reversed in such a way that the stable potential side thereof is adjacent to the secondary winding S.

According to the transformer 1 shown in FIG. 8, the winding layers P1-1 and P2-1 are arranged farthest from the secondary winding S, to reduce parasitic capacitance with respect to the secondary winding S because these winding layers P1-1 and P2-1 are connected to the switching element Q1, and therefore, are subjected to large voltage variations. The winding layers P2-2 and P1-2 are arranged nearest to the secondary winding S so that parasitic capacitance is large because the winding layers P2-2 and P1-2 are connected to the stable potential, and therefore, are subjected to small voltage variations. These configurations reduce high-frequency currents passing through the secondary winding S induced by current passing through the first and second primary windings P1 and P2a.

As is apparent in FIGS. 10 and 11, a high-frequency current passing from the winding layer P2-1 to the secondary winding S is remarkably reduced. Accordingly, the transformer 1 of the embodiment is appropriate to form a partial voltage resonance converter that is structurally simple, is capable of reducing common-mode noise, and realizes a zero-cross switch with the use of a flyback voltage induced on the secondary winding S.

Terminals of the winding layers P1-2 and P2-2 are connected to the positive electrode side of the DC power source E, and therefore, are subjected to no voltage variation. The winding layers P1-2 and P2-2 also serve as electromagnetic shields for the winding layers P1-1 and P2-1, so that substantially no high-frequency current passes from the winding layers P1-1 and P2-1 to the secondary winding S. This further reduces common-mode noise.

A main cause of the common-mode noise is a current passing from each of the first and second primary windings P1 and P2a to the secondary winding S. This current will be explained in detail.

A capacitor is an element to accumulate charge. The quantity of charge in a capacitor is expressed with the capacitance C (corresponding to the parasitic capacitance of the embodiment) of the capacitor and a voltage V applied to the capacitor:

$$Q=CV \quad (1)$$

A current I corresponds to the quantity of charge that moves per unit time:

$$I=dQ/dt \quad (2)$$

By differentiating the expression (1), the expressions (1) and (2) provide the following:

$$dQ/dt=I=CdV/dt \quad (3)$$

According to the expression (3), it is understood that the current I is proportional to the capacitance and a voltage change per unit of time. Namely, a current passing from any one of the first and second primary windings P1 and P2a to the secondary winding S is proportional to the corresponding parasitic capacitance and a voltage change.

The transformers of FIGS. 4 and 10 substantially provide the same parasitic capacitance between the adjacent winding layers if the winding width of each winding layer is the same. Accordingly, in the transformer 1a of the related art, the parasitic capacitance between the winding layer P1-2 and the secondary winding S that are close to each other and the parasitic capacitance between the winding layer P2-1 and the secondary winding S that are close to each other is large. Also in the transformer 1a, the parasitic capacitance between the winding layer P1-1 and the secondary winding S that are distant from each other and the parasitic capacitance between the winding layer P2-2 and the secondary winding S that are distant from each other is small.

According to the embodiment, a voltage variation on the winding layers P1-2 and P2-2 connected to the stable potential side is half a voltage variation on the winding layers P1-1 and P2-1 being connected to the switching element Q1, when measured from the stable potential side.

Figure 12:
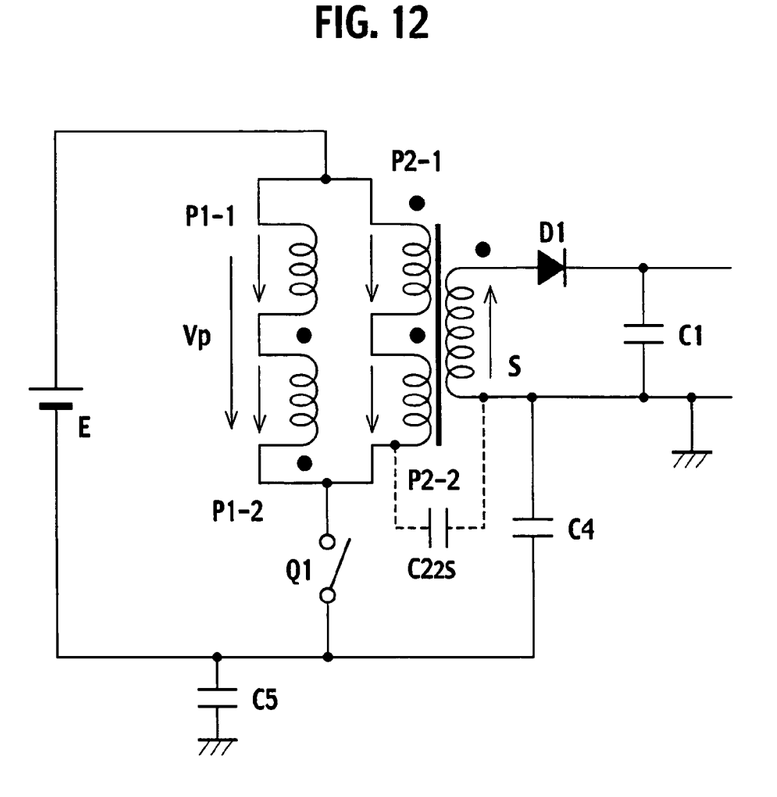
FIG. 12 is a view showing voltages generated on the windings of the transformer when a switching element shown in FIG. 11 is turned off.

FIG. 12 shows voltages generated on the windings of the transformer 1 when the switching element Q1 is turned off. When the first primary winding P1 induces a voltage Vp, each of the winding layers P1-1 and P1-2 induces a voltage of Vp/2 that is half the voltage Vp.

Figure 13A:
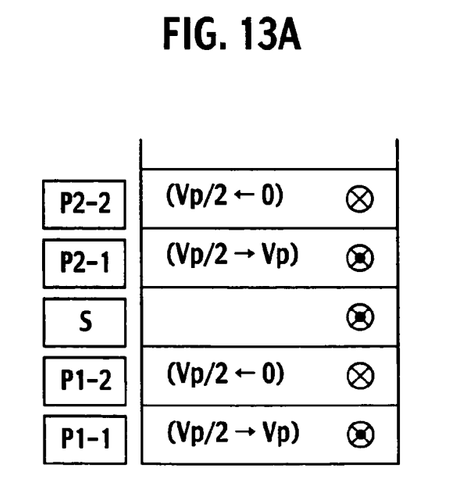
FIG. 13A is a view showing voltages on the windings of the transformer according to the related art.
Figure 13B:
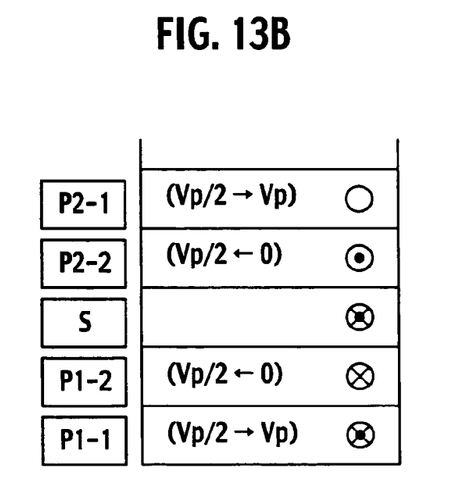
FIG. 13B is a view showing voltages on the windings of the transformer according to the embodiment of the present invention.

FIG. 13A shows voltages on the windings of the transformer 1a according to the related art of FIGS. 1 and 2, and FIG. 13B shows voltages on the windings of the transformer 1 according to the embodiment of the present invention. In FIGS. 13A and 13B, a value between parentheses is a voltage induced on a winding with the stable potential side being a reference (zero).

In FIG. 13A, the transformer 1a of the related art shown in FIGS. 1 and 2 induces a voltage of 0 to Vp/2 on the winding layer P1-2 adjacent to the secondary winding S and a voltage of Vp/2 to Vp on the winding layer P2-1 adjacent to the secondary winding S.

On the other hand, the second primary winding P2a is reversely arranged with respect to the first primary winding P1 of the embodiment as shown in FIGS. 8 and 11. As a result, as shown in FIG. 13B, each of the winding layers P1-2 and P2-2 that are adjacent to the secondary winding-S induces a voltage of 0 to Vp/2.

Comparing the transformer 1 of the embodiment with the transformer 1a of the related art, it should be noted that, although the winding layer P1-2 of each example induces the same voltage of 0 to Vp/2, the winding layer P2-2 of the embodiment induces the voltage of 0 to Vp/2 that is half the voltage of Vp/2 to Vp induced by the winding layer P2-1 of the related art that is arranged at the-same location as the winding layer P2-2 of the embodiment. As is apparent in FIGS. 10 and 11, a high-frequency current passing from the winding layer P2-2 to the secondary side through the parasitic capacitance C22S according to the embodiment is half a high-frequency current of the transformer 1a of the related art. Consequently, the transformer 1 of the embodiment can reduce common-mode noise.

The second primary winding P2a of the embodiment is reversed relative to the first primary winding P1 without increasing the length of leads. Therefore, the winding layers P1-2 and P2-2 being adjacent to the secondary winding S can be connected to the stable potential side without increasing leakage inductance. As a result, the embodiment can reduce common-mode noise.

According to the embodiment, each of the first and second primary windings P1 and P2a has two winding layers. Instead, each of the first and second primary windings P1 and P2a may have three or more winding layers.

For example, in a case where each of the first and second primary windings P1 and P2a may be made of three winding layers, a terminal of a winding layer being farthest from the secondary winding S among the three layers in each of the first and second primary windings P1 and P2a is connected to the switching element Q1. And a terminal of a winding layer being nearest to the secondary winding S among the three layers in each of the first and second primary windings P1 and P2a is connected to the positive electrode side of the DC power source E.

The winding direction of the second primary winding P2a is made opposite to the winding direction of the first primary winding P1. In this case, a terminal voltage of the three winding layers in each of the first and second primary windings P1 and P2a is Vp. Then, a voltage variation on the winding layer nearest to the secondary winding S is reduced to 0 to Vp/3. This results in further reducing high-frequency currents passing from the first and second primary windings P1 and P2a to the secondary winding S. In this way, the three-layer winding can reduce high-frequency currents, i.e., common-mode noise more than the two-layer winding.

Effect of the Invention

According to the first aspect of the present invention, the first primary winding is arranged on an inner side of the secondary winding and the second primary winding on an outer side of the secondary winding and a terminal of the winding layer farthest from the secondary winding among the winding layers of each of the first and second primary windings is connected to the switching element. Namely, each winding that is subjected to a large voltage variation is arranged at a location where parasitic capacitance is small, to reduce high-frequency currents passing from the first and second primary windings to the secondary winding. This configuration is appropriate to form a partial voltage resonance converter having a simple structure and capable of realizing a zero-cross switch with the use of a flyback voltage generated on the secondary winding.

According to the second aspect of the present invention, the winding direction of the second primary winding is opposite to the winding direction of the first primary winding. If a terminal voltage of the winding layers of each of the first and second primary windings is Vp, a voltage variation on a winding layer nearest to the secondary winding is 0 to Vp/{the number of winding layers}. Due to such a small voltage variation, high-frequency currents passing from the first and second primary windings to the secondary winding are small. This results in further reducing common-mode noise. The second aspect of the present invention involves no increase in the number of leads, and therefore, never increases leakage inductance.

According to the third aspect of the present invention, a terminal of a winding layer nearest to the secondary winding among the winding layers of each of the first and second primary windings is connected to the DC power source. As a result, the winding layer nearest to the secondary winding involves no voltage variation, and therefore, serves as a shield for a winding layer farthest from the secondary winding, the farthest winding layer being subjected to a large voltage variation. Consequently, there will be no high-frequency currents passing from the farthest winding layers to the secondary winding.

INDUSTRIAL APPLICABILITY

The present invention is applicable to power source apparatuses such as DC-DC converters and AC-DC converters.

This application claims benefit of priority under 35 USC §119 to Japanese Patent Applications No. 2004-249949, filed on Aug. 30, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC power source apparatus comprising: a switching element being connected to a primary winding of a transformer and configured to carry out ON/OFF operations to convert a DC voltage provided by a DC power source into high-frequency power; a rectifying/smoothing circuit configured to convert the high-frequency power being transmitted from the primary winding to a secondary winding of the transformer into a DC output voltage; and a controller configured to control ON/OFF intervals of the switching element according to the DC output voltage so that a predetermined output voltage is supplied to a load, wherein:
   the primary winding of the transformer includes a first primary winding having a plurality of winding layers and a second primary winding having a plurality of winding layers;
   the first primary winding is arranged on an inner side of the secondary winding;
   the second primary winding is arranged on an outer side of the secondary winding; and
   a terminal of a winding layer being farthest from the secondary winding among the winding layers of each of the first and second primary windings is connected to the switching element.

2. The DC power source apparatus of claim 1, wherein the winding direction of the second primary winding is opposite to the winding direction of the first primary winding.

3. The DC power source apparatus of claim 2, wherein a terminal of a winding layer nearest to the secondary winding among the winding layers of each of the first and second primary windings is connected to the DC power source.

4. The DC power source apparatus of claim 1, wherein a terminal of a winding layer nearest to the secondary winding among the winding layers of each of the first and second primary windings is connected to the DC power source.

* * * * *